Patented Feb. 13, 1951

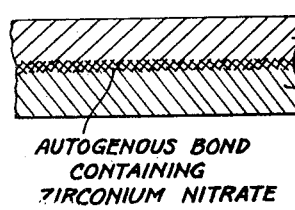
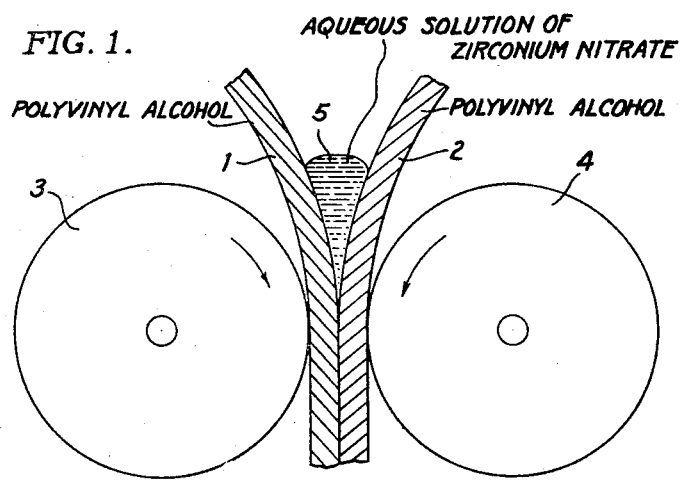
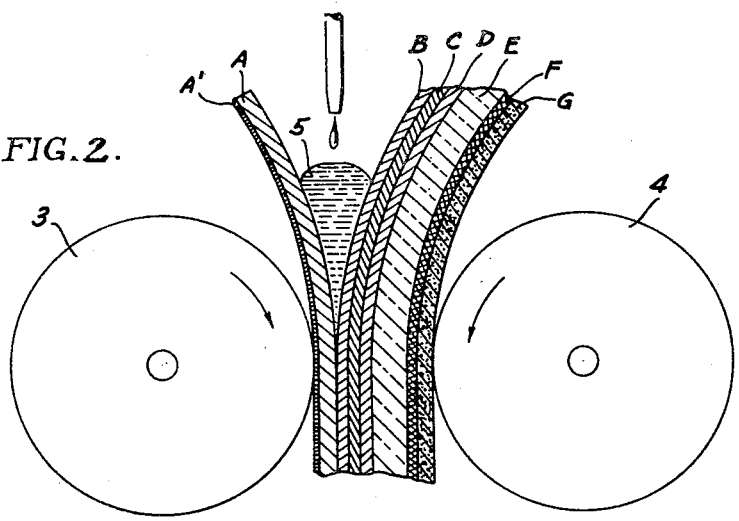
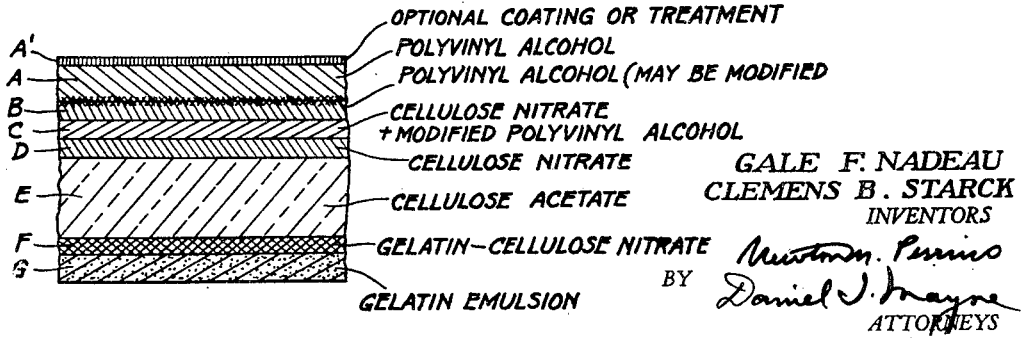

2,541,478

UNITED STATES PATENT OFFICE 2,541,478

LAMINATING PROCESS AND PRODUCTS

Gale F. Nadeau and Clemens B. Starck, Rochester, N. Y., assignors to Eastman Kodak Company, Rochester, N. Y., a corporation of New Jersey Application June 29, 1945, Serial No. 602,226

8 Claims. (Cl. 154—139)

This invention relates to the lamination of synthetic sheet material and more particularly to a process by the use of which it is possible to obtain a strong, autogenous bond between the surfaces of two sheets or layers composed predominantly of polyvinyl alcohol.

As knowledge of the properties and practical applications of the various vinyl resins has extended, increasing industrial use has been made of these materials. Among the various resins polyvinyl alcohol has proved eminently satisfactory for certain types of sheeting and as subbing and other layers in the manufacture of photographic film base. In certain specific applications, however, it has proved unsatisfactory. For example, in the lamination of sheets or layers composed of polyvinyl alcohol it has been found that the use of the usual procedures for lamination did not provide a bond of sufficient strength to prevent the ultimate separation of the two joined surfaces, particularly when the laminated product was subjected to the action of various processing baths such as the developing and fixing solutions of photography. One method of laminating polyvinyl alcohol sheets or layers is to apply water to the surfaces to be joined and subject the sheet material to pressure while wet, since water has a sufficient solvent or softening effect upon the polyvinyl alcohol to render it susceptible of lamination. Experience has shown, however, that the resulting bond is insufficient and that a tendency toward separation or stripping of the layers arises later on, particularly if the sheet material is subjected to the action of various types of processing baths.

This invention has as its object to provide a process of laminating sheets or layers composed predominantly of polyvinyl alcohol so as to provide a strong, autogenous bond between the laminated surfaces. A further object is to provide a process for laminating, not only sheets of polyvinyl alcohol or modified polyvinyl alcohol, but also one sheet of such polyvinyl alcohol to another sheet which has been coated or subbed with polyvinyl alcohol or a polyvinyl alcohol-containing composition. A still further object is to provide an improved laminated polyvinyl alcohol or modified polyvinyl alcohol sheet material in which the various polyvinyl alcohol laminæ have no tendency to separate under the ordinary conditions of use or when treated with various types of processing baths. Another object is to provide a laminated structure in which a sheet of cellulose derivative material subbed or coated with a layer of polyvinyl alcohol or a polyvinyl alcohol-containing composition is autogenously joined through the polyvinyl alcohol sub-layer to a sheet or layer of polyvinyl alcohol. Other objects will appear hereinafter.

These objects are accomplished by the following invention, which in its broader aspects, is based on the discovery that if polyvinyl alcohol surfaces are laminated under the influence of water containing a small amount of a hardening agent for polyvinyl alcohol or modified polyvinyl alcohol, such as zirconium nitrate, a strong, autogenous bond between the surfaces is produced and the resulting laminated structure is unsusceptible of separation at the interface. While we do not confine ourselves to any particular theory or explanation of the phenomenon taking place, it is our belief that the water penetrates into and softens or solvates the polyvinyl alcohol material of the respective surfaces to such an extent that they flow together at the interface and under the influence of the hardening agent form a hardened autogenous bond.

In the following examples and description we have set forth several of the preferred embodiments of our invention but they are included merely for purposes of illustration and not as a limitation thereof.

Our invention will be more fully understood by reference to the accompanying drawing in which like numerals and letters refer to like parts and in which, Fig. 1 illsutrates a method of laminating two sheets composed of polyvinyl alcohol in accordance with our invention.

Fig. 2 illustrates the lamination of a sheet of polyvinyl alcohol to a photographic film having an emulsion on one surface and a polyvinyl alcohol layer or sub on the other surface prepared in accordance with our invention.

Fig. 3 is a cross-section, greatly magnified, of a laminated polyvinyl alcohol sheet prepared in accordance with our invention and such as would result from the process illustrated in Fig. 1.

Fig. 4 is a cross-section, also greatly magnified, of a structure resulting from the lamination of a sheet of polyvinyl alcohol to the polyvinyl alcohol-subbed surface of a photographic film by the process illustrated in Fig. 2.

Referring to Fig. 1, the numerals 1 and 2 designate, respectively, two sheets composed of polyvinyl alcohol or modified polyvinyl alcohol, a material the chemical characteristics of which are generally referred to in our Patent No. 2,362,580.

The resin may, on the one hand, be a substance consisting wholly of polyvinyl alcohol. On the other hand, the material may contain anywhere from a trace to a substantial percentage of polyvinyl acetate. For example, we may employ a polyvinyl alcohol containing small amounts of polyvinyl acetate or we may employ a polyvinyl alcohol containing as much as 37.9% or more of polyvinyl acetate. The material containing polyvinyl acetate may be referred to as a modified polyvinyl alcohol. By the term modified polyvinyl alcohol we refer only to compositions resulting from the hydrolysis of polyvinyl acetate and not to mere mixtures of polyvinyl alcohol and polyvinyl acetate.

The resins to which we refer are those sold by the R & H Division of the Du Pont Company under the trade designations RH–403 (polyvinyl alcohol containing 27% polyvinyl acetate and having a viscosity of 50 centipoises), RH–489 (polyvinyl alcohol containing 37.9% polyvinyl acetate and having a viscosity of 27 centipoises) and RH–349 a substantially pure polyvinyl alcohol having a viscosity of 24 centipoises. In general, we have found that the modified polyvinyl alcohols having viscosities within the range of 20–50 centipoises (4% aqueous solution) are particularly suitable for use in our invention.

As shown, the sheet material is fed between two rolls ordinarily known as "V-ing rolls" 3 and 4 rotatably mounted and driven in directions indicated by the arrows on the rolls. Rolls 3 and 4 are adjustable with respect to the distances between centers so that a suitable pressure may be brought to bear upon the contacting surfaces of the sheet.

Numeral 5 designates an aqueous bead maintained at the opening between two sheets of the material undergoing lamination, adjacent the point of contact. This bead, in accordance with the invention, is composed of an aqueous solution of a hardening agent for polyvinyl alcohol or modified polyvinyl alcohol, such, for example, as a .5–5% aqueous solution of zirconium nitrate. The bead is maintained by a constant feed from a suitable source, the flow being so regulated as to provide at all times a sufficient amount of the solution to wet both surfaces of the polyvinyl alcohol material being laminated. As the sheets of polyvinyl alcohol are fed toward the pinch of the rolls the inner surfaces pick up a certain amount of the solution which softens or solvates it, whereupon as the material progresses between the rolls, the softened or solvated portions intermingle to form a strong, hardened, autogenous bond.

As will be evident, our invention is not limited to the lamination of single or unitary structures composed exclusively of polyvinyl alcohol or modified polyvinyl alcohol, but may also be applied to the lamination of composite structures in which the surfaces to be joined are composed of polyvinyl alcohol or modified polyvinyl alcohol. For example, we may laminate a sheet composed of polyvinyl alcohol to a composite material such as a photographic film composed of a cellulose derivative film support having a photographically-sensitive emulsion on one surface and a polyvinyl alcohol layer on the other surface. This type of lamination in accordance with our invention is illustrated by Fig. 2.

Referring to Fig. 2, the process there illustrated is essentially the same as that shown in Fig. 1, the only difference being that a photographic film composed, for example, of a cellulose acetate film support E having a photographically-sensitive gelatin emulsion G united to one surface through the agency of a gelatin-cellulose nitrate sub F and having on its opposite surface a polyvinyl alcohol layer or sub B united to the cellulose acetate material through the agency of a cellulose nitrate-modified polyvinyl alcohol sub C and a cellulose nitrate sub D, is employed as one of the sheets to be laminated, the other sheet being a sheet of polyvinyl alcohol or modified polyvinyl alcohol A.

The polyvinyl alcohol sheet A, as illustrated in Fig. 2, may consist of a simple sheet of polyvinyl alcohol or modified polyvinyl alcohol or the sheet may include any type of coated surface desired, such as the coating designated as A'. This coating may consist of polarizing dyes, crystalline substances, or effect materials of various kinds. Alternatively, the polyvinyl alcohol sheet A may actually contain within its internal structure various polarizing dyes or other materials which may have been placed therein by imbibition or other processes.

As further shown by the cross-sectional view of Fig. 4, the resulting laminated film has the polyvinyl alcohol sheet A autogenously welded or bonded to the polyvinyl alcohol layer B of the film, thus forming a solid film structure. This type of film is particularly characterized by the fact that when the film is processed, as by carrying it through the ordinary developing and fixing baths, the polyvinyl alcohol layers will not separate and the film will retain its useful characteristics indefinitely.

As indicated above, the broad scope of our invention includes the use of any agent which will serve to harden polyvinyl alcohol or modified polyvinyl alcohol material. Examples of such hardeners are chromium salts such as chromic chloride, chromic nitrate, sodium dichromate, ammonium dichromate; various aluminum salts such as aluminum nitrate, aluminum chloride. However, of all the hardening agents with which we have had experience, we have found zirconium nitrate to be unusual and outstanding in its ability to produce strong, hardened, autogenous bonds when employed in aqueous solution for lamination of sheets or surfaces composed of polyvinyl alcohol or modified polyvinyl alcohol.

What we claim is:

1. The continuous process of laminating a sheet composed of a polyvinyl alcohol resin selected from the group consisting of polyvinyl alcohol and a modified polyvinyl alcohol containing not over 37.9% polyvinyl acetate to another sheet of the same material which comprises continuously passing the two sheets between pressure rolls in such manner that the sheets form a V-shaped opening therebetween, simultaneously treating the opposed surfaces of the sheets by maintaining at the opening of the V adjacent the point of contact of the sheets as they pass between the rolls a bead consisting of an aqueous solution of zirconium nitrate, whereby the opposed sheet surfaces are solvated and caused to coalesce and the sheets are thereby united by a strong, hardened autogenous bond.

2. A laminated sheet composed of a plurality of sheets each of which is composed of a polyvinyl alcohol resin selected from the group consisting of polyvinyl alcohol and a modified polyvinyl alcohol containing not over 37.9% polyvinyl acetate, each sheet being joined to the next adjacent sheet by means of a strong, hardened autogenous bond consisting of coalesced polyvinyl alcohol resin hardened by the presence therein of zirconium nitrate.

3. The process of bonding together two preformed sheets composed predominantly of polyvinyl alcohol which comprises treating one of the surfaces of each of the sheets with a solution consisting essentially of a .5 to 5% zirconium nitrate in water whereby the sheet surfaces are solvated and caused to coalesce and pressing the solvated surfaces together whereby the sheets are united by a strong, hardened autogenous bond.

4. A process of bonding together two preformed sheets of modified polyvinyl alcohol consisting essentially of 27–37.9% polyvinyl acetate, the balance polyvinyl alcohol which comprises treating one surface of each of the sheets with a solution of .5–5% of zirconium nitrate in 95–99.5% water whereby the surfaces are solvated and pressing the solvated surfaces together whereby the sheets are united by a strong, hardened autogenous bond.

5. The multilayered structure comprising a layer of gelatin emulsion, a layer of gelatin and cellulose nitrate, a layer of cellulose acetate, a layer of cellulose nitrate and modified polyvinyl alcohol, a first layer of polyvinyl alcohol and a second layer of polyvinyl alcohol, all of said layers being bonded to the other layers adjacent thereto and the structure being characterized in that the first and second polyvinyl alcohol layers are joined to each other by an autogenous bond formed by the reaction of zirconium nitrate with polyvinyl alcohol at the bond interface.

6. The multilayered structure comprising a layer of gelatin emulsion, a layer of gelatin and cellulose nitrate, a layer of cellulose acetate, a layer of cellulose nitrate and modified polyvinyl alcohol, a first layer of polyvinyl alcohol and a second layer of polyvinyl alcohol, all of said layers being bonded to the other layers adjacent thereto and the first and second polyvinyl alcohol layers being joined to each other by an autogenous bond formed by the reaction of an aqueous agent from the group consisting of chromic chloride, chromic nitrate, sodium dichromate, ammonium dichromate, aluminum nitrate, aluminum chloride, and zirconium nitrate with polyvinyl alcohol at the bond interface of said first and second layers of polyvinyl alcohol.

7. A process of bonding together two opposed surfaces composed predominantly of polyvinyl alcohol which comprises treating the opposed surfaces with a solution comprising water containing as an essential ingredient .5–5% of an inorganic hardening agent for the polyvinyl alcohol from the group consisting of chromic chloride, chromic nitrate, sodium dichromate, ammonium dichromate, aluminum nitrate, aluminum chloride and zirconium nitrate, whereby the opposed surfaces are solvated and caused to coalesce and pressing the surfaces together whereby the surfaces are united by a strong, hardened autogenous bond formed by the reaction of the aqueous inorganic hardening agent with the polyvinyl alcohol at the bond interface.

8. The process of bonding together two modified polyvinyl alcohol sheets composed predominantly of 62.1–95% of polyvinyl alcohol and 5%–37.9% of polyvinyl acetate which comprises treating the opposed surfaces of the sheets to be laminated with an aqueous solution of a water-soluble hardening agent for the polyvinyl alcohol from the group consisting of chromic chloride, chromic nitrate, sodium dichromate, ammonium dichromate, aluminum nitrate, aluminum chloride and zirconium nitrate, the balance of the solution being substantially all water, whereby the opposed sheet surfaces are solvated and caused to coalesce and pressing the sheets together whereby the sheets are united by a strong, hardened autogenous bond.

GALE F. NADEAU.
CLEMENS B. STARCK.

REFERENCES CITED

The following references are of record in the file of this patent:

UNITED STATES PATENTS

| Number | Name | Date |
|---|---|---|
| 1,510,243 | Perry | Sept. 30, 1924 |
| 1,844,716 | Lambert | Feb. 9, 1932 |
| 2,072,597 | Keen et al. | Mar. 2, 1937 |
| 2,218,255 | Weyerts et al. | Oct. 15, 1940 |
| 2,249,514 | Berg | July 15, 1941 |
| 2,310,223 | Eaton et al. | Feb. 9, 1943 |
| 2,343,775 | Land | Mar. 7, 1944 |
| 2,343,975 | Hosfeld | Mar. 14, 1944 |
| 2,362,026 | Quist | Nov. 7, 1944 |
| 2,362,580 | Nadeau et al. | Nov. 14, 1944 |
| 2,399,338 | Ford | Apr. 30, 1946 |

OTHER REFERENCES

"Polyvinyl Alcohol," Jones, British Plastics, Dec. 1943, pp. 380–384, Feb. 1944, pp. 77–83, March 1944, pp. 122–128.